United States Patent
Butcher et al.

(10) Patent No.: US 10,152,264 B1
(45) Date of Patent: Dec. 11, 2018

(54) MEMORY DEVICE UPDATE SYSTEM

(71) Applicant: Dell Products L.P., Round Rock, TX (US)

(72) Inventors: Wade Andrew Butcher, Cedar Park, TX (US); Vijay Bharat Nijhawan, Austin, TX (US); Vadhiraj Sankaranarayanan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/675,272

(22) Filed: Aug. 11, 2017

(51) Int. Cl.
| | |
|---|---|
| *G06F 12/00* | (2006.01) |
| *G06F 3/06* | (2006.01) |
| *G06F 9/30* | (2018.01) |
| *G06F 9/4401* | (2018.01) |
| *G06F 12/02* | (2006.01) |
| *G06F 11/14* | (2006.01) |

(52) U.S. Cl.
CPC .......... *G06F 3/0646* (2013.01); *G06F 9/3004* (2013.01); *G06F 9/4401* (2013.01); *G06F 11/1417* (2013.01); *G06F 12/0238* (2013.01)

(58) Field of Classification Search
CPC .... G06F 3/0646; G06F 9/3004; G06F 9/4401; G06F 11/1417; G06F 12/0238; G06F 12/0607
See application file for complete search history.

(56) References Cited

U.S. PATENT DOCUMENTS 9,471,231 B2 * 10/2016 Bollandoor .......... G06F 3/0619

OTHER PUBLICATIONS

John E. Jenne, Vadhiraj Sankaranarayanan and Andrew Butcher, System and Method to Perform Runtime Saves on Dual Data Rate NVDIMMS, U.S. Appl. No. 15/445,236, filed Feb. 26, 2017, 25 Pages.
Andy Butcher, Vijay Nijhawan and Sumanth Vidyadhara, "Automated Intra-System Persistent Memory Updates," U.S. Appl. No. 15/581,054, filed Apr. 28, 2017, 35 Pages.

* cited by examiner

*Primary Examiner* — Shawn X Gu
(74) *Attorney, Agent, or Firm* — Haynes and Boone, LLP (57) ABSTRACT

A memory device update system includes a computing device couple to a management device. While the computing device is in a pre-boot environment, a memory device update engine in the computing device assigns a memory type, which is associated with the storage of memory device update information, to memory region(s) in a memory subsystem in the computing device. Subsequent to a boot of the computing device such that the computing device is in a runtime environment, the memory device update engine retrieves memory device update information from the management device and uses a data communication interface between the memory device update engine and the memory subsystem to write the memory device update information to the memory region(s) that were assigned the memory type. While the computing device is in the runtime environment, the memory subsystem then uses the memory device update information to update the memory subsystem.

20 Claims, 6 Drawing Sheets

MEMORY DEVICE UPDATE SYSTEM

BACKGROUND

The present disclosure relates generally to information handling systems, and more particularly to updating memory devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server computing devices, desktop computing devices, laptop computing devices, and/or other computing devices known in the art, are now being provided with memory devices that may be updated with software. For example, Non-Volatile Dual Inline Memory Modules (NVDIMMs) provided with computing devices may include firmware that may be updated. However, the updating of memory devices such as NVDIMMs suffers from a variety of issues. Conventional methods for updating an NVDIMM requires the copying of updated firmware to the NVDIMM, and then performing a firmware-update-specific reboot in order to have that updated firmware applied to the NVDIMM by an on-NVDIMM controller. For example, some conventional computing devices utilize an Operating System (OS) based utility that performs a command handshake over the System Management bus (SMBUS) and then operates to transfer the updated firmware over the SMBUS to the NVDIMM, which is followed by a reboot of the computing device that causes the updated firmware to be applied to the NVDIMM. However, such conventional methods are relatively slow due to the relatively slow data transfer speeds provided by the SMBUS, and require the firmware-update-specific reboot in order to have the updated firmware applied to the NVDIMM, which takes the computing device "offline" or otherwise makes that computing device unavailable for use for a period of time. Furthermore, the ability to provide firmware updates using such conventional methods is in question, as the SMBUS interface to the NVDIMMs may be locked post-boot. One solution to providing firmware updates on NVDIMMs when the SMBUS interface is locked post-boot is to store the updated firmware on a motherboard memory device and then force a reboot that causes a driver in the Basic Input Output System (BIOS) to install the updated firmware via the SMBUS, which suffers from the issues discussed above. It has been suggested that firmware updates may be provided post-boot via the BIOS, but such firmware updates would entail the BIOS performing piecemeal copying of the updated firmware over the SMBUS using periodic System Management Interrupts (SMIs), which could impact computing device performance, and would still utilize the relatively slow data transfer speed SMBUS.

Accordingly, it would be desirable to provide an improved memory device update system.

SUMMARY

According to one embodiment, an Information Handling System (IHS) includes a memory subsystem including a memory device and a memory subsystem controller; a BIOS subsystem that is coupled to the memory subsystem and configured to: assign, while the IHS is in a pre-boot environment, a memory type to a memory region in the memory device, wherein the memory type is associated with the storage of memory device update information; an update subsystem that is coupled to the memory subsystem and configured to: retrieve memory device update information; and write, using a data communication interface between the update subsystem and the memory subsystem while the IHS is in a runtime environment, the memory device update information to the memory region that was assigned the memory type; wherein the memory subsystem controller is configured to: use, while the IHS is in the runtime environment, the memory device update information to update the memory device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
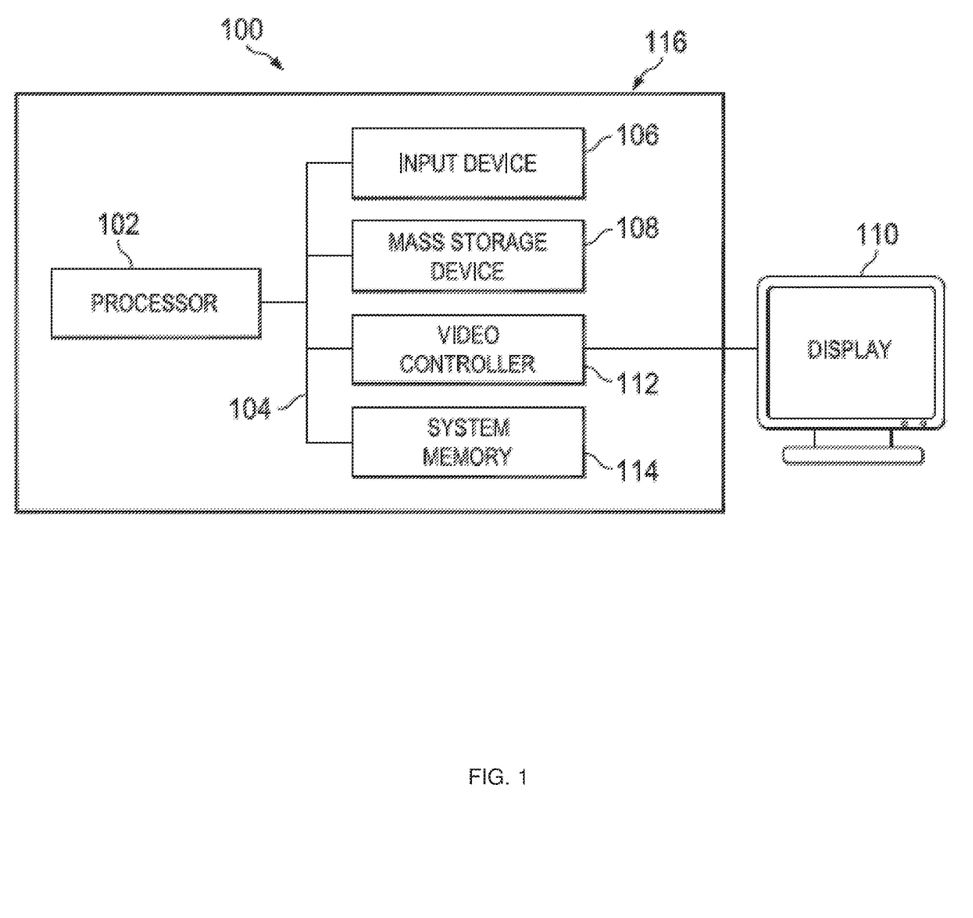
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102. For example, the processor 102 may be connected to the system memory 114 via a Double Data Rate (DDR) bus, to the video controller 112 via a Peripheral Component Interconnect express (PCIe) bus, and to the mass storage device 108 via a Serial Advanced Technology Attachment (SATA) bus.

Figure 2:
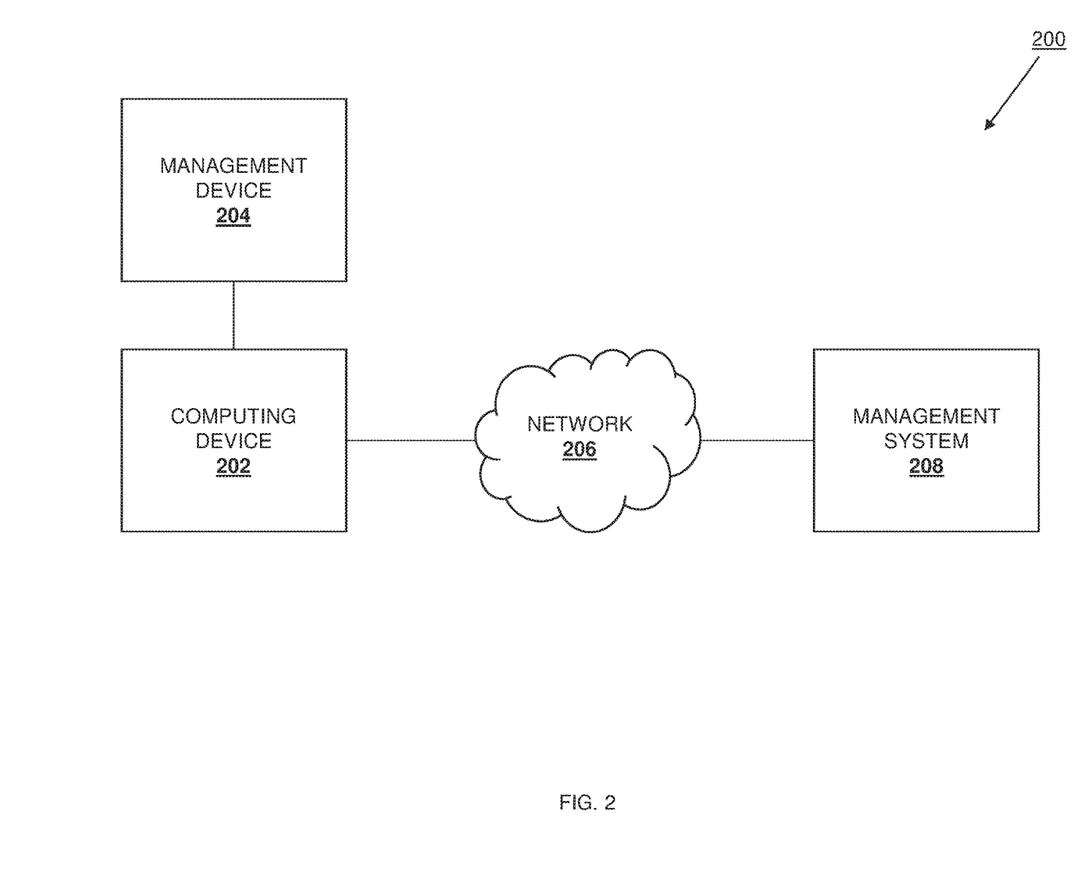
FIG. 2 is a schematic view illustrating an embodiment of memory device update system.

Referring now to FIG. 2, an embodiment of a memory device update system 200 is illustrated. The memory device update system 200 includes a computing device 202 that may be coupled to a management device, a management system, or other memory update providing device or entity known in the art. In an embodiment, the computing device 202 may be the IHS 100 discussed above with reference to FIG. 1, and/or may include some or all of the components of the IHS 100. For example, the computing device 202 may be a server computing device, a desktop computing device, a laptop/notebook computing device, and/or any other computing device utilizing updatable memory devices or memory subsystems. FIG. 2 illustrates how the computing device 202 may be coupled directly to a management device 204, or to a management system 208 via a network 206. Either or both of the management device 204 and/or the management system 208 may be the IHS 100 discussed above with reference to FIG. 1, and/or may include some or all of the components of the IHS 100. In the specific examples discussed below, the management device 204 is described as a portable storage device such as a Universal Serial Bus (USB) storage device, although other portable computing devices such as laptop/notebook computing devices, tablet computing devices, mobile phones, and/or any other computing device that is configured to store update information will fall within the scope of the present disclosure. Similarly, in the specific examples discussed below, the management system 208 is described as a server computing system, although other computing devices such as desktop computing devices and/or any other computing device that is configured to store update information will fall within the scope of the present disclosure.

Figure 3:
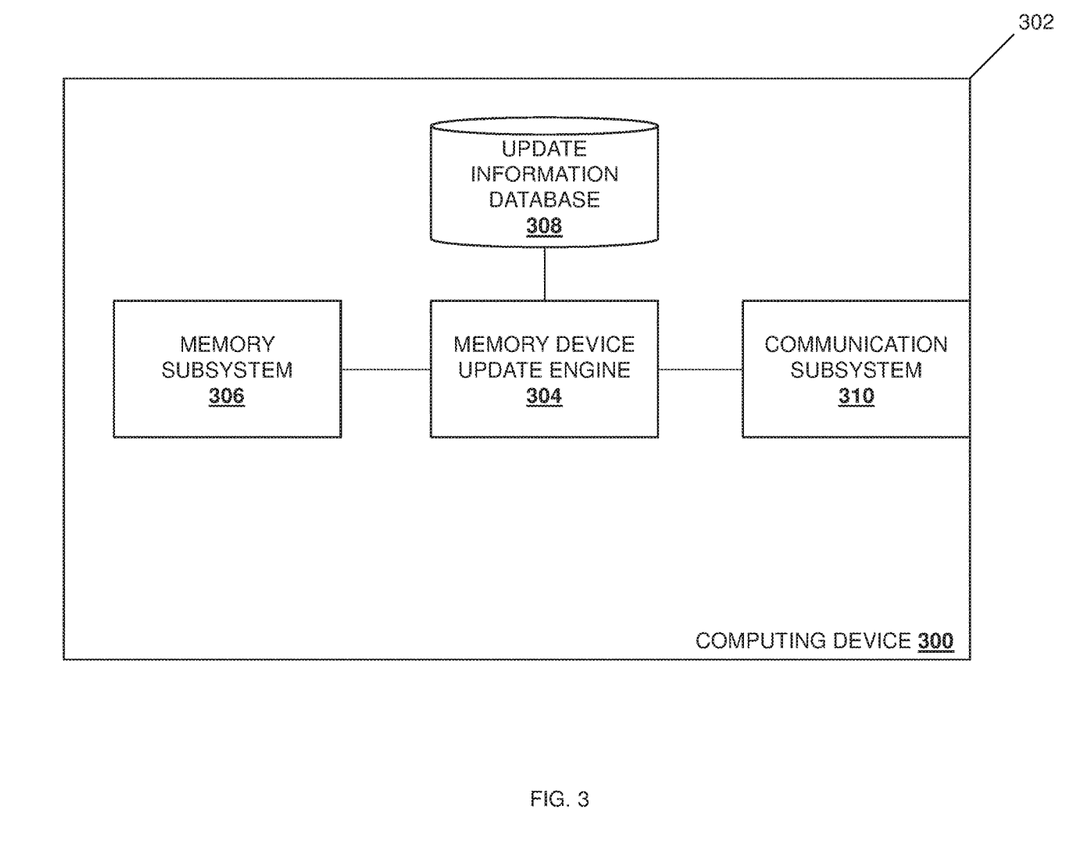
FIG. 3 is a schematic view illustrating an embodiment of a computing device used in the memory device update system of FIG. 2.

Referring now to FIG. 3, an embodiment of a computing device 300, which may be the computing device 202 discussed above with reference to FIG. 2, is illustrated. As such, the computing device 300 may be may be the IHS 100 discussed above with reference to FIG. 1 and/or may include some or all of the components of the IHS 100, and in specific embodiments may be a server computing device, a desktop computing device, a laptop/notebook computing device, and/or any other computing device utilizing updatable memory devices or memory subsystems. In a specific example, the computing device 300 may be a 14$^{th}$ Generation (14G) server computing device provided by DELL® Inc. of Round Rock, Tex., United States. In the illustrated embodiment, the computing device 300 includes a chassis 302 that houses the components of the computing device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 3) that includes instructions that, when executed by the processing system, cause the processing system to provide a memory device update engine 304 that is configured to perform the functions of the memory device update engines and computing devices discussed below.

The chassis 302 may also house a memory subsystem 306 that is coupled to the memory device update engine 304 (e.g., via a coupling between the memory subsystem 306 and the processing system) and that includes one or more memory devices. As discussed below, the memory subsystem 306 may include a plurality of memory devices, and one or more of those memory devices may be updateable with software. In a specific example, the memory subsystem 306 includes one or more Non-Volatile Dual Inline Memory Module (NVDIMM) devices that include firmware that may be updated, although other types of memory devices updateable with other types of software may benefit from the teachings of the present disclosure and thus will fall within its scope as well. In some embodiment, the memory system used to provide the memory device update engine 304 may include memory devices in the memory subsystem 306, while in other embodiments, the memory system that is used to provide the memory device update engine 304 may utilize memory devices that are separate and distinct from the memory devices in the memory subsystem 306. For example, the memory system used to provide the memory device update engine 304 may utilize volatile memory devices, while the memory subsystem 306 may utilize the non-volatile memory devices discussed herein. However, a wide variety of modification to the memory subsystem 306 and the memory system that provides the memory device update engine, other than what has been described above, is envisioned as falling within the scope of the present disclosure as well.

The chassis 302 may also house a storage subsystem (not illustrated, but which may include the storage device 108 discussed above with reference to FIG. 1) that is coupled to the memory device update engine 304 (e.g., via a coupling between the storage subsystem and the processing subsystem) and that includes an update information database 308 that may store the update information and/or any of the other information utilized to provide the functionality discussed below. The chassis 302 may also house a communication subsystem 310 that is coupled to the memory device update engine 304 (e.g., via a coupling between the communication subsystem 310 and the processing system) and that may include a Network Interface Controller (NIC), a wireless communication subsystem (e.g., a BLUETOOTH® communication subsystem, a Near Field Communication (NFC) subsystem, a WiFi communication subsystem, and/or any other wireless communication subsystem known in the art), and/or any other components utilized to communication with the management device 204, the management system 208 via the network 206, and/or provide any of the other communication functionality discussed below. While a specific computing device 300 has been described, one of skill in the art in possession of the present disclosure will recognize that the computing device 300 may include a variety of other components and/or configurations that operate to provide a variety of conventional computing device functionality, as well as the functionality discussed below, while remaining within the scope of the present disclosure.

Figure 4:
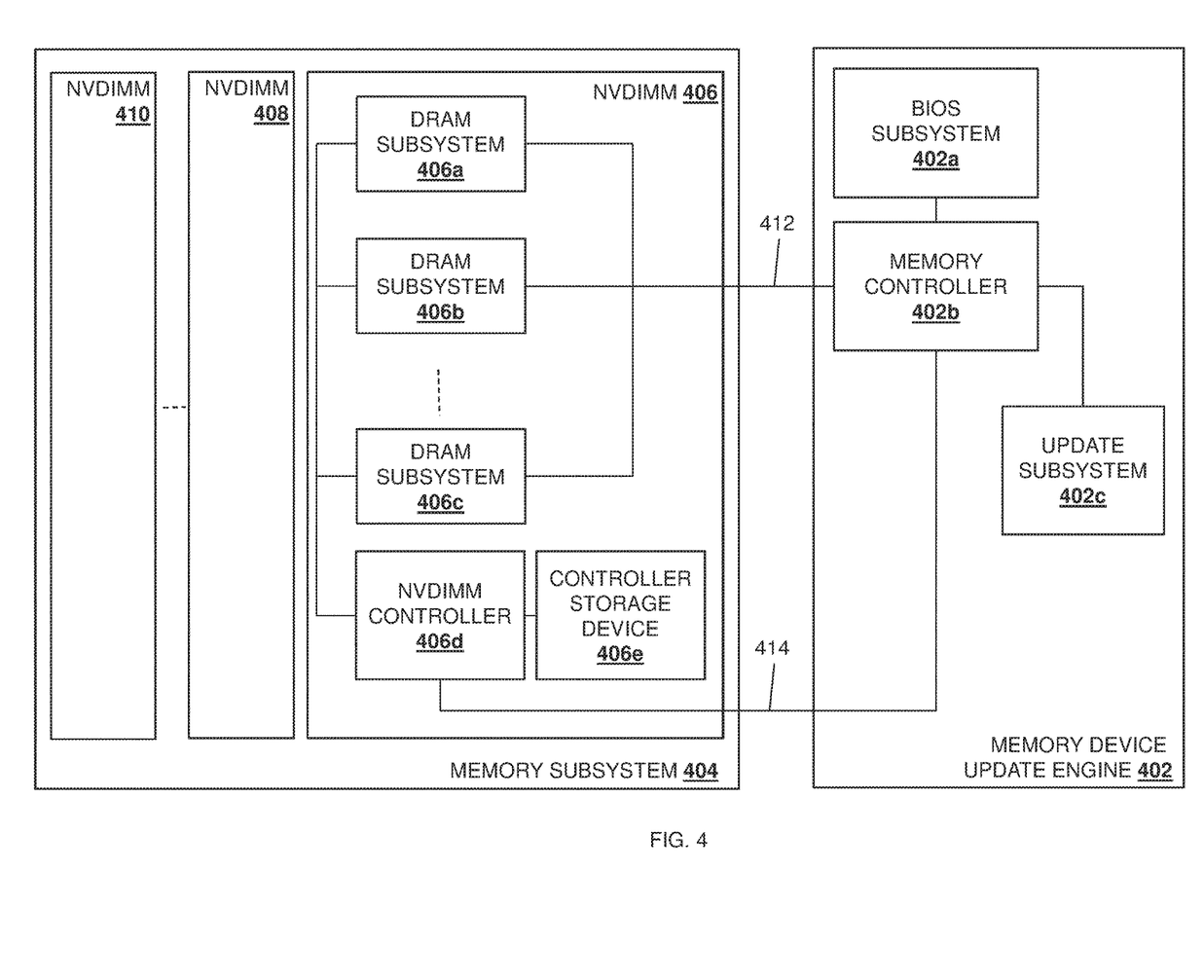
FIG. 4 is a schematic view illustrating an embodiment of a memory subsystem and a memory device update engine used in the computing device of FIG. 3.

Referring now to FIG. 4, an embodiment of a memory device update engine 402 and a memory subsystem 404, which may be the memory device update engine 304 and the memory subsystem 306, respectively, discussed above with reference to FIG. 3, are illustrated. While not explicitly illustrated, as discussed above, the memory device update engine 402 may be provided by a processing system that may include one or more of the processors 102 discussed above with reference to FIG. 1, and a memory system that may include the system memory 114 discussed above with reference to FIG. 1. In the illustrated embodiment, the memory device update engine 402 includes a Basic Input Output System (BIOS) subsystem 402a that may be provided by, for example, BIOS instructions that are included on the memory system and executed by the processing system. As would be understood by one of skill in the art, the BIOS subsystem 402a may be provided by non-volatile firmware that is configured to perform hardware initialization during a boot process that is performed in a pre-boot environment (e.g., in response to a power-on, startup, reboot, or other initialization of the computing device 202/300), as well as provide runtime services for an operating system (OS) and programs running on the computing device 202/300 during a runtime environment that follows a boot of the computing device resulting from the performance of the boot process. The BIOS subsystem 402a is coupled to a memory controller 402b that is included in the memory device update engine 402. In an embodiment, the memory controller 402b may be provided by a digital circuit that is configured to manage the flow of data to and from the memory subsystem 404, and may be provided on a separate chip from the processing system that provides the memory device update engine 402, or integrated into a chip that provides that processing system. The memory device update engine 402 also includes an update subsystem 402c that may be provided by, for example, update subsystem instructions that are included on the memory system and executed by the processing system. In a specific example, the update subsystem 402c may be provided by an Operating System (OS)-based utility, although one of skill in the art in possession of the present disclosure will recognize that other update subsystems will fall within the scope of the present disclosure as well.

In the illustrated embodiment, the memory subsystem 404 includes a plurality of NVDIMMs 406, 408, and up to 410. However, as discussed below, in some embodiments the memory subsystem 404 may include both NVDIMMs (that are configured to be provided with firmware updates) along with other types of DIMMs (e.g., Registered Dual Inline Memory Modules (RDIMMs) or other memory devices that are not configured to be provided with firmware updates) while remaining within the scope of the present disclosure. Furthermore, memory devices other than NVDIMMs that are updateable will benefit from the teachings of the present disclosure and thus are envisioned as falling within its scope as well. In the illustrated embodiment, the NVDIMM 406 is described in detail, and one of skill in the art will recognize that the NVDIMMs 408 and up to 410 may be substantially similar or utilize substantially similar functionality to that described below for the NVDIMM 406. In the illustrated embodiment, the NVDIMM 406 includes a plurality of Dynamic Random Access Memory (DRAM) subsystems 406a, 406b, and up to 406c, and each of the DRAM subsystems 406a-c are coupled to the memory controller 402b in the memory device update engine 402. In a specific example, the DRAM subsystems 406a-c may include Double Data Rate $4^{th}$ Generation Synchronous Dynamic Random Access Memory (DDR4 SDRAM) devices that are coupled to the memory controller 402b via a relatively high bandwidth data communication interface 412 such as a Double Data Rate (DDR) data interface, although other types of memory devices utilizing other types of relatively high bandwidth interfaces to a memory controller in a memory device update engine will fall within the scope of the present disclosure as well.

Each of the DRAM subsystems 406a-c are also coupled to an NVDIMM controller 406d. As would be understood by one of skill in the art in possession of the present disclosure, the NVDIMM controller 406d may be provided by an onboard DRAM controller (i.e., a controller that is provided on the NVDIMM 406 itself) that may be configured to trigger a DRAM backup process that saves information stored on the DRAM devices in the DRAM subsystems 406a-c in response to, for example, the removal of power from those DRAM devices, and then restore that saved information to the DRAM devices once power is restored to the DRAM devices. As such, while not explicitly illustrated in FIG. 4, the NVDIMM 406 may include a backup power source (e.g., a battery), and any or all of the DRAM subsystems 406a-c may be associated with nonvolatile storage device(s) (not illustrated, but typically provided by a flash storage device) to which the information from the DRAM devices may be saved as discussed above. For example, the NVDIMMs 406-410 may be NVDIMM-N devices that include flash storage and traditional DRAMs on the same module. While a specific NVDIMM controller has been described, one of skill in the art in possession of the present disclosure will recognize that other types of controllers that operate in different manners will fall within the scope of the present disclosure as well.

In the illustrated embodiment, the NVDIMM controller 406d is also coupled to a controller storage device 406e that is utilized as discussed below to store memory device update information. For example, the controller storage device 406e may be provided by a flash storage device, although other types of storage devices will fall within the scope of the present disclosure as well. The NVDIMM controller 406d is also coupled to the memory controller 402b in the memory device updated engine 402. In a specific example, the NVDIMM controller 406d is coupled to the memory controller 402b via a relatively low bandwidth System Management Bus (SMBUS) command/address interface 414, although other types of memory devices utilizing other types of relatively low bandwidth interfaces to a memory controller in a memory device update engine will fall within the scope of the present disclosure as well. While specific memory device update engine components and memory subsystem components are illustrated in FIG. 4 and described as providing the functionality discussed below, one of skill in the art in possession of the present disclosure will recognize that components other than those illustrated and described may be substituted while remaining within the scope of the present disclosure.

Figure 5:
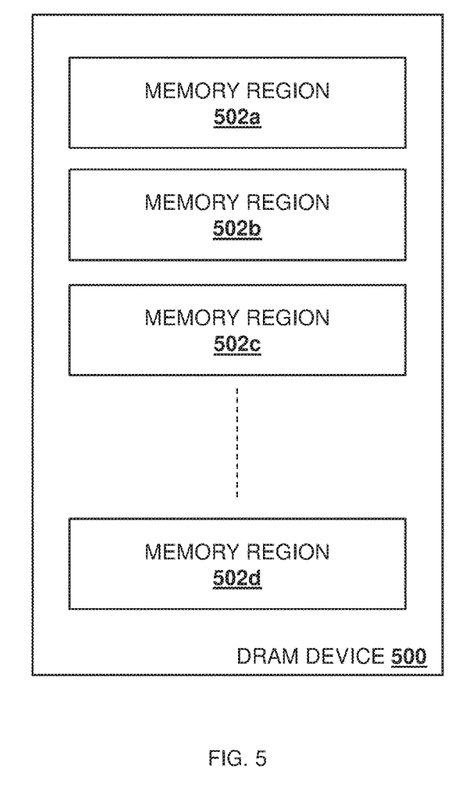
FIG. 5 is a schematic view illustrating an embodiment of Dynamic Random Access Memory (DRAM) device used in the memory subsystem of FIG. 4.

Referring now to FIG. 5, an embodiment of DRAM device 500, which may be provided in the DRAM subsystems 406a-c discussed above, is illustrated. In the illustrated embodiment, the DRAM device 500 may include a plurality of memory regions 502a, 502b, 502c, and up to 502d. With reference to the discussion below, the memory regions 502a-d may include a beginning memory region (e.g., memory region 502a) and an end memory region (e.g., memory region 502d) whose relative locations (e.g., "beginning" and "end") may be defined by associated memory address ranges in a memory map, discussed below. However, one of skill in the art in possession of the present disclosure will recognize that the relative locations of the memory regions in a DRAM device may be defined in any manner, and as discussed below, the storage of data in memory regions via a memory controller operating in an interleaving mode will fall within the scope of the present disclosure as well.

Figure 6:
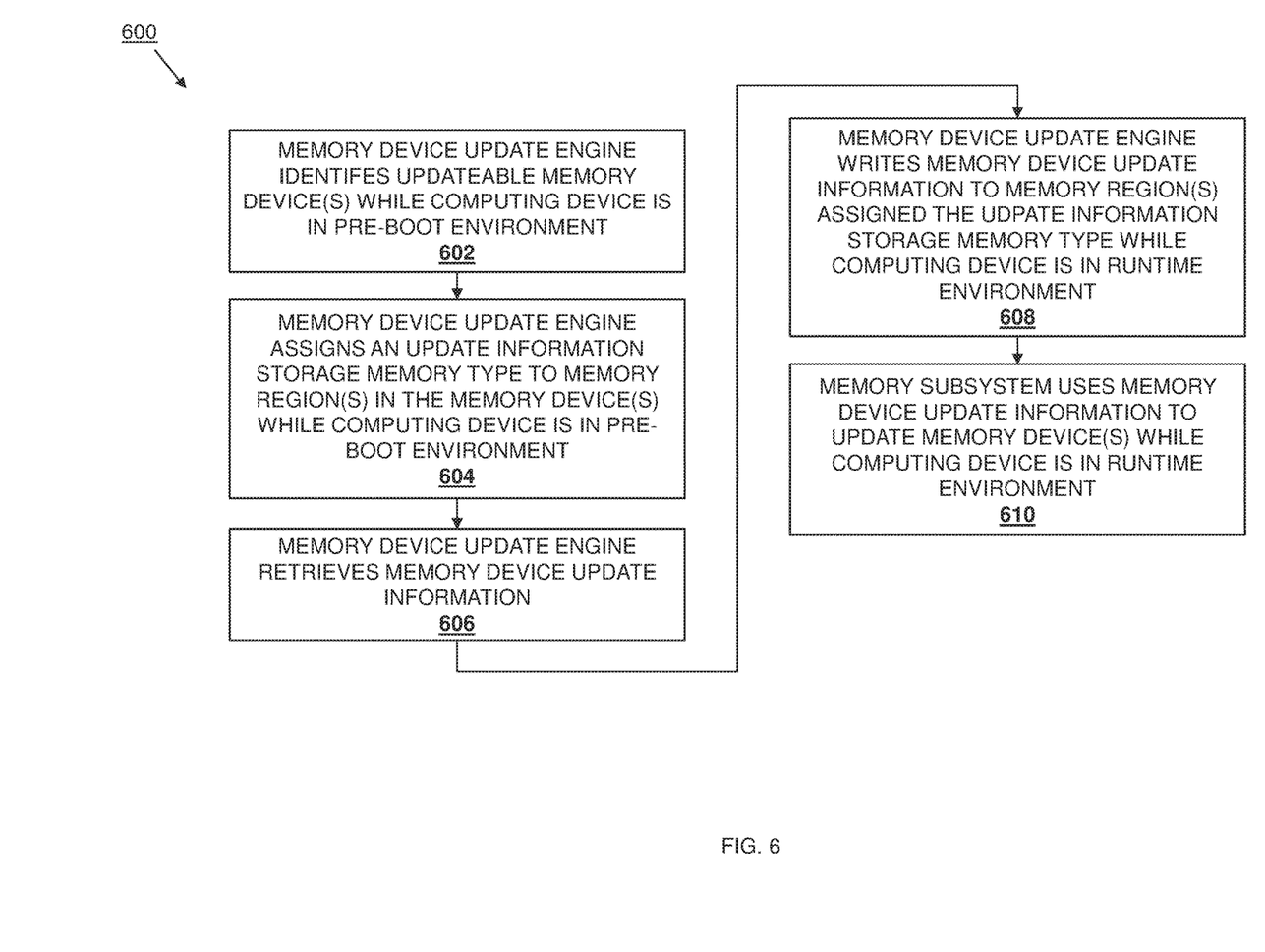
FIG. 6 is a flow chart illustrating an embodiment of a method for updating a memory device.

Referring now to FIG. 6, an embodiment of a method 500 for updating memory devices is illustrated. As discussed below, the present disclosure provides systems and methods that operate to provide for the updating of memory devices while their computing system is online (i.e., while in a runtime environment and without the need for a reboot) and utilizing a relatively high speed interface, which allows for quick and seamless memory device updates. Embodiments of such systems and methods may operate by allocating memory region(s) of the memory devices to store memory device update information, and assigning those memory region(s) a new Advanced Configuration and Power Interface (ACPI) memory type that is associated with the storage of memory device update information. Subsequently, when memory device update information is received while the computing device is in a runtime environment, the systems and methods locate the memory region(s) with that memory type and write the memory device update information to those memory region(s) using a relatively high speed data communication interface (e.g., a DDR data interface) while the computing device remains in the runtime environment. The systems and methods may then operate to take the memory devices offline (e.g., by putting those memory devices in a self-refresh mode), and use the memory device update information to update the memory devices while the computing device remains in the runtime environment. As such, memory device updates are performed quickly (e.g., via a relatively high bandwidth data communication interface rather than a relatively low bandwidth SMBUS command/address interface) and without the need to take the computing device offline.

The method 600 begins at block 602 where a memory device update engine identifies updateable memory device(s) while a computing device is in a pre-boot environment. In an embodiment, at or before block 602, the computing device 202/300 may be started up, rebooted, or otherwise initialized, which one of skill in the art will in possession of the present disclosure will recognize will cause the computing device 202/300 to enter a pre-boot environment in which the BIOS subsystem 402a performs a boot process that will subsequently result in a boot of the computing device 202/300 such that it enters a runtime environment. As such, in some embodiments, at block 602 the computing device 202/300 may be in the pre-boot environment and the memory device update engine 304/402 may access the memory subsystem 306/404 to identify updateable memory devices. In a specific embodiment, the BIOS subsystem 402a may access, via the memory controller 402b and through the SMBUS command/address interface 414, the memory subsystem 306/404 to identify each of the memory devices in the memory subsystem 306/404. As discussed above, while the memory subsystem 404 is illustrated as including only NVDIMMs 406-410, the memory subsystem 404 may include both memory devices that are updateable (e.g., with firmware or other software as with the NVDIMMs discussed herein) and memory devices that are not updateable. For example, the memory subsystem 306/404 may include RDIMMs that do not have firmware that may be updated, along with the NVDIMMs 406 that have firmware that may be updated, and at block 602 the BIOS subsystem 402a may identify those RDIMMs as not updateable with firmware. As such, at block 602, the BIOS subsystem 402a may identify the NVDIMMs 406-410 in the memory subsystem 306/404, and determine that they each include firmware that may be updated, or that they may otherwise be provided with updated firmware.

The method 600 then proceeds to block 604 where the memory device update engine assigns an update information storage memory type to memory region(s) in the memory device(s) while the computing device is in the pre-boot environment. In an embodiment, at block 604, following the identification of the updateable memory device(s) in the memory subsystem 306/404 while the computing device 202/300 is in the pre-boot environment, the memory device update engine 304/402 may operate to assign an update information storage memory type to memory region(s) in those updateable memory device(s) while the computing device remains in the pre-boot environment. In some embodiments, the update information storage memory type may be defined as a new memory type according to the ACPI specification. In a specific example, the update information storage memory type may be a memory type of "15" or higher (e.g., 15 to 0×6FFFFFFF, 0×70000000 to 0×7FFFFFFF, 0×80000000 to 0×FFFFFFFF), which at the time of the filing of the present application are reserved memory types according to the ACPI specification (see pgs. 709 and 710 of the ACPI specification version 6.1.) As such, the update information storage memory type may be reserved for use in utilizing memory regions in memory devices (discussed below) for storage of memory device update information. However, one of skill in the art in possession of the present disclosure will recognize that any value may be selected for the update information storage memory type if that value may be associated with the storage of memory device update information as discussed below.

In an embodiment, at block 604, the BIOS subsystem 402a may operate to generate, modify, or otherwise provide a memory map that is associated with the memory devices (e.g., the DRAM devices 500 in the NVDIMMs 406-410 in the memory subsystem 306/404), and then allocate memory region(s) (e.g., one or more of the memory regions 502a-502d) in those memory devices for the storage of memory device update information, and assign those memory region(s) the update information storage memory type in that memory map. In some embodiments, memory region(s)

in DRAM device(s) in each NVDIMM 406-410 may be assigned the update information storage memory type such that each of those NVDIMMs may store the memory device update information that will be used to update that NVDIMM. For example, the memory map may include:

| TYPE | BASE | LENGTH | TYPE |
|---|---|---|---|
| MEMORY | 0000 0000 0000 | 4 G | 1 |
| RESERVED | 0001 0000 0000 | 1 G | 2 |
| UPDATE INFORMATION STORAGE | 0001 4000 0000 | 16 MB | 15 |
| MEMORY | 0001 4100 0000 | 4 G | 1 |
| UPDATE INFORMATION STORAGE | 0002 4100 0000 | 16 MB | 15 |

In a specific example, the memory region(s) in the DRAM device(s) in each NVDIMM 406-410 may be allocated such that they are located at the end of the address range for that NVDIMM, which provides for a maximum contiguous memory space in each NVDIMM while allowing each NVDIMM to store memory device update information. However, in other embodiments, memory region(s) in DRAM device(s) in an NVDIMM may be assigned the update information storage memory type such that NVDIMM may store memory device update information for updating that NVDIMM as well as other NVDIMMs (i.e., such that one NVDIMM may store memory device update information for itself and/or one or more other NVDIMMs.) Furthermore, the memory region(s) in the DRAM device(s) in NVDIMMs may be allocated such that they are located anywhere in the address range for that NVDIMM, and in some cases interleaved across DRAM devices 500 or NVDIMMs, while remaining within the scope of the present disclosure. While a few examples have been provided, one of skill in the art in possession of the present disclosure will recognize that the allocation of memory region(s) in the memory device(s) and their assignment of the update information storage memory type may be performed in a variety of manners that will fall within the scope of the present disclosure. As such, following block 604, memory region(s) in at least some of (and in some embodiments, in each of) the memory device(s) are assigned the update information storage memory type, and in some embodiments, the BIOS subsystem 402a may subsequently inform the NVDIMM controller 406d (e.g., via the SMBUS command/address interface 414) about the location of those memory region(s) so that the NVDIMM controller 406d may correlate those memory region(s) with the DRAM devices 500 in the NVDIMMs 406-410.

The method 600 then proceeds to block 606 where the memory device update engine retrieves memory device update information. In an embodiment, at or before block 606, the BIOS subsystem 402a may complete the boot process such that the computing device 202/300 boots and enters the runtime environment. In an embodiment, at block 606 and while the computing device is in the runtime environment, the memory device update engine 304/402 may operate to retrieve memory device update information via the communication subsystem 310. For example, the update subsystem 402c (e.g., an OS-based utility operating in the runtime environment) may utilize the communication subsystem 310 to connect to the management device 204 and/or the management subsystem 208 via the network 206. For example, the management device 204 may be a USB storage device that stores memory device update information, and may be connected to a port provided by the communication subsystem 310. In response, the update subsystem 402c may retrieve (through the communication subsystem 310) the memory device update information stored on the management device 204. In some embodiments, the update subsystem 402c may then operate to store that memory device update information in the update information database 308, although direct copying of memory device update information from the management device 204 to the memory subsystem 306/404, discussed below, will fall within the scope of the present disclosure as well.

In another example, the management system 208 may be a network connected server device that stores memory device update information, and the update subsystem 402c may utilize the communication subsystem 310 (e.g., in response to scheduled periodic update checks, direct instructions from a user, etc.) to connect to the management system 208 through the network 206. In response, the update subsystem 402c may retrieve (through the network 206 via the communication subsystem 310) the memory device update information stored on the management system 208. In some embodiments, the update subsystem 402c may then operate to store that memory device update information in the update information database 308, although direct copying of memory device update information from the management system 208 to the memory subsystem 306/404, discussed below, will fall within the scope of the present disclosure as well. While a few examples of the retrieval of memory device update information have been described, one of skill in the art in possession of the present disclosure will recognize that memory device update information (e.g., firmware updates) may be retrieved and handled in a variety of manners that will fall within the scope of the present disclosure as well.

The method 600 then proceeds to block 608 where the memory device update engine writes the memory device update information to the memory region(s) assigned the update information storage memory type while the computing device is in the runtime environment. In an embodiment, at block 608 and while the computing device 202/300 remains in the runtime environment, the memory device update engine 304/402 operates to write the memory device update information retrieved at block 606 to the memory region(s) that were assigned the update information storage memory type in block 604. For example, at block 606, the update subsystem 402c may access the memory map (e.g., by querying the memory map via an ACPI interface) to locate all of the memory region(s) that were assigned the update information storage memory type (e.g., type 15 in the example memory map above), and the write the memory device update information retrieved at block 606 to those memory region(s) using the data communication interface 412 (e.g., a relatively high bandwidth DDR interface.) As discussed above, the update subsystem 402c may retrieve the memory device update information from the update information database 308 and write it to the memory region(s) at block 608, or may write the memory device update information directly from the management device 204 or management subsystem 408 to the memory region(s) while remaining within the scope of the present disclosure.

The method 600 then proceeds to block 610 where a memory subsystem uses the memory device update information to update the memory device(s) while the computing device is in the runtime environment. In an embodiment, at block 610 and while the computing device 202/300 remains in the runtime environment, the memory subsystem 306/404 operates to use the memory device update information that was written to the memory region(s) at block 608 to update the memory device(s) in the computing device 202/300. In a specific example, at block 610, the update subsystem 402c may copy the memory device update information to the controller storage device 406e, direct the NVDIMM controller 406d to take the NVDIMM 406 "offline" (e.g., by causing the NVDIMM 406 to enter a self-refresh mode), and use the memory device update information that was copied to the controller storage device 406e to update the NVDIMM 406, after which the NVDIMM 406 be brought back "online" and resume runtime operations. Systems and methods for temporarily taking an NVDIMM "offline" are described in U.S. patent application Ser. No. 15/455,236, filed on Feb. 28, 2017 (and naming as co-inventors two of the co-inventors of the subject matter of the present application), the disclosure of which is incorporated by reference in its entirety. As discussed above, the memory device update information may be a firmware update, and thus at block 610, the NVDIMM controller 406d operates to take the NVDIMM 406 "offline" (e.g., by causing the NVDIMM 406 to enter a self-refresh mode) while the computing device 202/300 is "online" (e.g., in the runtime environment), perform the firmware update on the NVDIMM 406 while the computing device remains "online" (e.g., in the runtime environment), and then bring the NVDIMM 406 back "online" to resume runtime NVDIMM operations.

While specific embodiments of updating memory devices have been described above, a variety of modification to those embodiments is envisioned as falling within the scope of the present disclosure. For example, in one embodiment, the updating of memory devices using the memory device update information discussed above may be performed following a reboot and an NVDIMM restore operation, rather than while the computing device is in the runtime environment. In such an embodiment, the memory device update information may be written to the memory region(s) that were assigned the update information storage memory type as discussed above (i.e., blocks 602-608 of the method 600 may be performed as discussed above), but the use of the memory device update information to update the memory devices may be performed following an NVDIMM restore operation. For example, following block 608 of the method 600, the update operation may result in a reboot of the computing device 202/300, and upon reboot the NVDIMM controller 406d may detect the memory device update information that was written (prior to the reboot using the data communication interface 412 while the computing device was in the runtime environment) to the memory region(s) in the memory devices that were assigned the update information storage memory type. In response to detecting that memory device update information in those memory region(s), the NVDIMM controller 406d may operate to automatically use that memory device update information to update the NVDIMM 406. In some embodiments, the memory device update information written to those memory region(s) may include a signature that, when detected by the NVDIMM controller 406d, causes the NVDIMM controller to perform the automatic update of the NVDIMM 406 using that memory device update information. While such embodiments include a reboot of the computing device 202/300, that reboot may be the result of a planned service window or the result of an unplanned power loss that may have caused the reboot to occur anyway (i.e., the reboot is not a memory-device-update-specific reboot, but rather occurs as a result of normal operations), and still provides the benefits of the high speed memory device update information write via the data communication interface 414. Furthermore, an update that occurs in this manner does not require a reboot that is in addition to the reboot that occurred for any of the other reasons discussed above.

In another embodiment, the operation of the systems and methods of the present disclosure may be modified to take memory interleaving into account. As would be understood by one of skill in the art in possession of the present disclosure, the BIOS subsystem 402a may operate to put the memory controller 402b into a memory interleaving mode that causes the memory controller 402b to write data across different NVDIMMs 406-410. When memory interleaving is utilized, the systems and methods of the present disclosure may manipulate the memory device update information based on the memory interleaving mode of the memory controller 402b to cause the memory device update information to be provided on each DRAM device. For example, the BIOS subsystem 402a may operate to allocate memory regions in the NVDIMMs 406-410 with the update information storage memory type, but the memory map may be provided with a single, contiguous portion (e.g., at the end of the memory map) rather than having multiple portions of the memory map duplicated for each of the NVDIMMs 406-410. The size of such a contiguous portion of the memory map may be calculated using the size needed for the memory device update information multiplied by the number of NVDIMMs 406-410 in the memory subsystem 404. The update subsystem 402c may then access the memory map (e.g., by querying the memory map via an ACPI interface or by checking a setting or other variable written by the BIOS subsystem 402a) to determine that the memory map is interleaved, and then operate to duplicate each byte of the memory device update information such that it is copied to each of the NVDIMMs. For example, using memory device update information "1234" that is provided for a memory subsystem with four NVDIMMs, that memory device update information would then be written by the memory controller in memory interleaving mode to the memory subsystem as "1111 2222 3333 4444", which would write each byte or unit of the memory device update information such that each of the four NVDIMMs is provided the memory device update information "1234".

Thus, embodiments of the systems and methods have been described that operate to allocate memory region(s) of NVDIMMs to store firmware updates, and assign those memory region(s) a memory type that is associated with the storage of firmware updates. Subsequently, when a firmware update for an NVDIMM is received while its computing device is in a runtime environment, the systems and methods locate the memory region(s) with that memory type and use a DDR data interface to write the firmware update to those memory region(s) while the computing device remains in the runtime environment. The systems and methods then operate to take the NVDIMM offline (e.g., by putting that NVDIMM in a self-refresh mode), and provide the firmware update to the NVDIMM while the computing device remains in the runtime environment. As such, firmware updates for NVDIMMs are performed quickly (e.g., via a DDR data interface rather than an SMBUS command/address interface) and without the need to reboot the computing device, which provides for quick and seamless updating of NVDIMMs while their computing device is online (i.e., without the need for a reboot.)

Although illustrative embodiments have been shown and described, a wide range of modification, change and substitution is contemplated in the foregoing disclosure and in some instances, some features of the embodiments may be employed without a corresponding use of other features.

Accordingly, it is appropriate that the appended claims be construed broadly and in a manner consistent with the scope of the embodiments disclosed herein.

What is claimed is:

1. A memory device update system, comprising:
   a management device; and
   a computing device that is coupled to the management device, wherein the computing device includes:
   a memory subsystem; and
   a memory device update engine that is coupled to the memory subsystem and configured to:
   assign, while the computing device is in a pre-boot environment, a memory type to at least one memory region in the memory subsystem, wherein the memory type is associated with storage of memory device update information;
   retrieve, from the management device and subsequent to a boot of the computing device such that the computing device is in a runtime environment, the memory device update information; and
   write, using a data communication interface between the memory device update engine and the memory subsystem while the computing device is in the runtime environment, the memory device update information to the at least one memory region that was assigned the memory type;
   wherein the memory subsystem is configured to:
   use, while the computing device is in the runtime environment, the memory device update information to update the memory subsystem.

2. The system of claim 1, wherein the memory device update engine is configured to:
   identify, while the computing device is in the pre-boot environment, at least one memory device in the memory subsystem that is configured to be updated, wherein the at least one memory region in the memory subsystem is located in the at least one memory device.

3. The system of claim 1, wherein each at least one memory region that is assigned the memory type is located at the end of an address range associated with at least one memory device included in the memory subsystem.

4. The system of claim 1, wherein the at least one memory region is assigned the memory type in a memory map.

5. The system of claim 4, wherein the at least one memory region is provided in a contiguous region of the memory map, and wherein the memory device update engine is configured to:
   write, in an interleaved write mode to the at least one memory region using the memory map, a copy of the memory device update information to each of a plurality of memory devices in the memory subsystem.

6. The system of claim 1, wherein the at least one memory region in the memory subsystem is located in at least one memory device, and wherein the memory subsystem is configured to:
   cause each at least one memory device to enter a refresh mode; and
   use the memory device update information to update each at least one memory device while each at least one memory device is in the refresh mode.

7. An Information Handling System (IHS), comprising:
   a memory subsystem including a memory device and a memory subsystem controller;
   a basic input output system (BIOS) subsystem that is coupled to the memory subsystem and configured to:
   assign, while the IHS is in a pre-boot environment, a memory type to a memory region in the memory device, wherein the memory type is associated with storage of the memory device update information;
   an update subsystem that is coupled to the memory subsystem and configured to:
   retrieve memory device update information; and
   write, using a data communication interface between the update subsystem and the memory subsystem while the IHS is in a runtime environment, the memory device update information to the memory region that was assigned the memory type;
   wherein the memory subsystem controller is configured to:
   use, while the IHS is in the runtime environment, the memory device update information to update the memory device.

8. The IHS of claim 7, wherein the BIOS subsystem is configured to:
   identify, while the IHS is in the pre-boot environment, that the memory device is configured to be updated.

9. The IHS of claim 7, wherein the memory region that is assigned the memory type is located at the end of an address range associated with the memory device.

10. The IHS of claim 7, wherein the memory region is assigned the memory type in a memory map.

11. The IHS of claim 10, wherein the memory region is provided in a contiguous region of the memory map, and wherein the memory device update engine is configured to:
    write, in an interleaved write mode to the memory region using the memory map, a copy of the memory device update information to the memory device.

12. The IHS of claim 7, wherein the memory subsystem controller is configured to:
    cause the memory device to enter a refresh mode; and
    use the memory device update information to update the memory device while the memory device is in the refresh mode.

13. The IHS of claim 7, wherein the memory subsystem includes a memory subsystem controller storage device, and wherein the memory subsystem controller is configured to:
    copy the memory device update information from the memory region to the memory subsystem controller storage device; and
    use the memory device update information in the memory subsystem controller storage device to update the memory device.

14. A method for updating memory devices, comprising:
    assign, by a BIOS subsystem in a computing device while the computing device is in a pre-boot environment, a memory type to at least one memory region in a plurality of memory devices included in a memory subsystem, wherein the memory type is associated with storage of memory device update information;
    write, by an update subsystem in the computing device using a data communication interface between the update subsystem and the memory subsystem and while the computing device is in a runtime environment, the memory device update information to the at least one memory region that was assigned the memory type; and
    using, by a memory subsystem controller in the memory subsystem while the computing device is in the runtime environment, the memory device update information to update the plurality of memory devices.

15. The method of claim 14, further comprising:

identifying, by the BIOS subsystem while the computing device is in the pre-boot environment, the plurality of memory devices included in the memory subsystem that are configured to be updated.

16. The method of claim 14, wherein the at least one memory region that is assigned the memory type is located at the end of an address range associated with each of the plurality of memory devices.

17. The method of claim 14, wherein the at least one memory region is assigned the memory type in a memory map.

18. The method of claim 17, wherein the at least one memory region is provided in a contiguous region of the memory map, and wherein the update subsystem is configured to:

write, in an interleaved write mode to the at least one memory region using the memory map, a copy of the memory device update information to each of the plurality of memory devices.

19. The method of claim 14, further comprising:

causing, by the memory subsystem controller, each of the plurality of memory devices to enter a refresh mode; and use, by the memory subsystem controller, the memory device update information to update each of the plurality of memory devices while each of the plurality of memory devices is in the refresh mode.

20. The method of claim 14, further comprising:

copy, by the memory subsystem controller, the memory device update information from the at least one memory region to a memory subsystem controller storage device; and use, by the memory subsystem controller, the memory device update information in the memory subsystem controller storage device to update each of the plurality of memory devices.

* * * * *